United States Patent
Lee et al.

(10) Patent No.: US 8,855,855 B2
(45) Date of Patent: Oct. 7, 2014

(54) VEHICLE CONTROL APPARATUS

(71) Applicant: Hyundai Motor Company, Seoul (KR)

(72) Inventors: Hui Sung Lee, Gyeonggi-do (KR); Kwang Myung Oh, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 19 days.

(21) Appl. No.: 13/846,457

(22) Filed: Mar. 18, 2013

(65) Prior Publication Data

US 2014/0136050 A1    May 15, 2014

(30) Foreign Application Priority Data

Nov. 9, 2012   (KR) .................. 10-2012-0126583

(51) Int. Cl.
  *G06F 3/043*    (2006.01)
  *G10L 11/04*    (2006.01)

(52) U.S. Cl.
  USPC .................. 701/36; 701/1; 327/517

(58) Field of Classification Search
  USPC .............. 701/1, 36; 345/174, 177; 327/517
  See application file for complete search history.

(56) References Cited

U.S. PATENT DOCUMENTS

| | | | | |
|---|---|---|---|---|
| 7,372,110 | B2* | 5/2008 | Hatano | 257/379 |
| 2002/0196238 | A1* | 12/2002 | Tsukada et al. | 345/173 |
| 2007/0070046 | A1* | 3/2007 | Sheynblat et al. | 345/173 |

FOREIGN PATENT DOCUMENTS

| | | |
|---|---|---|
| KR | 10-2008-0049974 | 6/2008 |
| KR | 10-0856919 | 6/2008 |
| KR | 10-2011-0090739 | 8/2011 |

* cited by examiner

*Primary Examiner* — Tan Q Nguyen
(74) *Attorney, Agent, or Firm* — Edwards Wildman Palmer LLP; Peter F. Corless

(57) ABSTRACT

S vehicle control apparatus that includes a touch panel configured to be touched by a user and a sound wave generator. The sound wave generator including a plurality of patterns formed in different shapes and heights on the touch panel, and is configured to generate sound waves having unique shapes when the user touches the patterns. A sound wave detection sensor is configured to detect the sound waves generated by the sound wave generator. A controller is configured to receive the sound waves detected by the sound wave detection sensor and output vehicle control signals corresponding to the respective sound waves.

10 Claims, 4 Drawing Sheets

FIG. 4

| EXAMPLE OF BASIC MENU NAVIGATION UI | |
|---|---|
| On/Off | TWO TAPPING ACTIONS USING NAILS OF TWO FINGERS |
| UP/DOWN/LEFT/RIGHT | MOVE ONE FINGER |
| CURSOR APPEARANCE | TOUCH WITH TWO FINGERS |
| CURSOR MOVEMENT | MOVE TWO FINGERS |
| SELECTION | ONE TAPPING ACTION USING NAIL OF ONE FINGER |
| CANCEL AND GO TO PREVIOUS MENU | TWO TAPPING ACTIONS USING NAIL OF ONE FINGER |

VEHICLE CONTROL APPARATUS

CROSS-REFERENCE

This application is based on and claims priority from Korean Patent Application No. 10-2012-0126583, filed on Nov. 9, 2012 in the Korean Intellectual Property Office, the disclosure of which is incorporated herein in its entirety by reference.

BACKGROUND OF THE INVENTION

1. Field of the Invention

The present invention relates, in general, to a device for controlling the operation of an electronic device using a user touch, and a vehicle control apparatus including the device.

2. Description of the Related Art

A plurality of electronic devices and mechanical devices are mounted on an interior of a vehicle to provide user convenience and to control the vehicle. The user may operate desired functions by manipulating these devices, and an input unit that receives the instructions for desired operations is required to control the devices. Furthermore, to input the instructions, instructions corresponding to desired operations are input using keys or buttons. Recently, with the application of various new technologies, a Human Machine Interface (HMI) integrated controller is required in some vehicles. However, a Driver Information System (DIS) integrated rotary key which has also be implemented in vehicles, has a substantially complex structure and thus, has an increased manufacturing cost.

Further, when a user touches a menu displayed on a touch screen in a touch screen type User Interface (UI), the user must alternately look in a forward direction and at a display screen while driving a vehicle, thus, causing an increased risk of collision. In addition, when the vehicle is in motion, it may be difficult for the user to precisely manipulate the touch screen due to the vibration of the vehicle, and to precisely and promptly detect information displayed on the screen due to the screen being blocked by the driver's hand when the driver touches the touch screen.

In a developed technology, when a user inputs a specific shape into a touch screen, the process includes comparing information input by the user with previously input trajectory data, determining which shape has been input, and then executing an instruction corresponding to a desired operation. However, data regarding the shapes and the corresponding operation must be stored and when a user incorrectly a shape or does not input the exact shape, erroneous recognition may be occur, and thus the shape must be drawn a predetermined size, for example for the processor to recognize the shape.

The foregoing is intended merely to aid in the better understanding of the background of the present invention, and is not intended to mean that the present invention falls within the purview of the related art that is already known to those skilled in the art.

SUMMARY

Accordingly, the present invention provides a vehicle control apparatus, which may accurately recognize a user touch without requiring the user to look in another direction.

Specifically, the present invention provides a vehicle control apparatus including a touch panel configured to be touched by a user; a sound wave generator including a plurality of patterns formed on the touch panel, wherein the patterns may be formed in different shapes or at different heights and the sound wave generator may be configured to generate sound waves having unique shapes when the user touches the patterns; a sound wave detection sensor configured to detect the sound waves generated by the sound wave generator; and a controller configured to receive the sound waves detected by the sound wave detection sensor and output vehicle control signals corresponding to the respective sound waves.

Furthermore, the controller may include sound wave data in which the vehicle control signals match the sound waves, and may be configured to, output a vehicle control signal matching the corresponding sound wave based on the sound wave data, in response to receiving a sound wave from the sound wave detection sensor.

Additionally, in the sound wave data, a single sound wave set may include a plurality of sound waves corresponding to (e.g., matching) a single vehicle control signal, and the controller may be configured to, output a vehicle control signal matching a corresponding sound wave set based on sound wave sets of the sound wave data, when a plurality of sound waves are consecutively received from the sound wave detection sensor.

Further, the sound wave sets may be classified as different types of sound wave sets and may match different types of vehicle control signals, and the controller may be configured to, detect a corresponding sound wave set depending on an order of the sound waves, and output a vehicle control signal matching the sound wave set when a plurality of sound waves are consecutively received from the sound wave detection sensor.

In particular, each pattern may include a plurality of projections protruding from the touch panel. Additionally, each projection may be formed in a shape of a bar and may be arranged on the touch panel in parallel at different heights. Alternatively, each projection may be formed in a shape of a circle and may be arranged on the touch panel in a matrix at different heights. The sound wave detection sensor may be a microphone and the control signals output from the controller may be signals required to control an Audio, Visual, Navigation (AVN) system.

Further, the present invention provides a vehicle control apparatus including a touch panel configured to be touched by a user; a sound wave generator including a plurality of patterns formed on the touch panel, wherein the patterns may be made of different materials and the sound wave generator may be configured to generate sound waves having unique shapes when the user touches the patterns; a sound wave detection sensor configured to detect the sound waves generated by the sound wave generator; and a controller configured to receive the sound waves detected by the sound wave detection sensor and output vehicle control signals corresponding to the respective sound waves.

BRIEF DESCRIPTION OF THE DRAWINGS

The above and other objects, features and advantages of the present invention will be more clearly understood from the following detailed description taken in conjunction with the accompanying drawings, in which:

FIG. 4 is an exemplary table showing a touch method according to an exemplary embodiment of the present invention.

DETAILED DESCRIPTION

Figure 1:
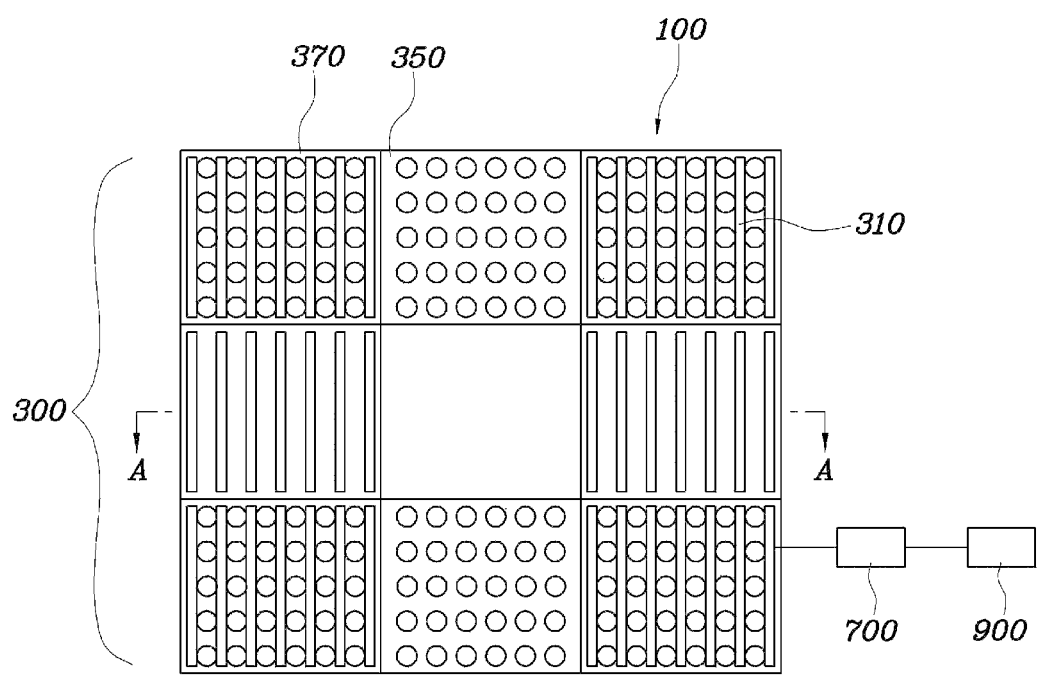
FIG. 1 is an exemplary diagram showing a vehicle control apparatus according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Hereinafter, exemplary embodiments of a vehicle control apparatus according to the present invention will be described in detail with reference to the accompanying drawings. Reference now should be made to the drawings, in which the same reference numerals are used throughout the different drawings to designate the same or similar components.

FIG. 1 is an exemplary diagram showing a vehicle control apparatus according to an exemplary embodiment of the present invention. The vehicle control apparatus may include a touch panel 100 configured to be touched by a user; a sound wave generator 300 including a plurality of patterns 310 formed on the touch panel 100, wherein the patterns 310 may be formed in different shapes or at different heights and the sound wave generator 300 may be configured to generate sound waves having unique shapes when the user touches the patterns; a sound wave detection sensor 500 configured to detect the sound waves generated by the sound wave generator 300; and a controller 700 configured to receive the sound waves detected by the sound wave detection sensor 500 and output vehicle control signals corresponding to the respective sound waves.

The controller 700 may include sound wave data, stored on a memory of the controller, in which the vehicle control signals match the sound waves. When the user touches the patterns 310 formed on the touch panel 100 and sound waves are generated by the sound wave generator 300, the controller 700 may be configured to receive the sound waves from the sound wave detection sensor 500. In addition, the controller 700 may be configured to compare the sound wave data received from the sound wave detection sensor 500 with the stored sound wave data, output a vehicle control signal matching the corresponding sound wave, and operate a control target 900.

The sound wave data may be implemented as a single sound wave or as a plurality of consecutive sound waves. The controller 700 may be configured to convert unique sound waves that may be generated from respective touched patterns into data and may produce resulting sound wave data. Accordingly, when a type of sound wave is detected, the controller 700 may be configured to operate the control target 900 by outputting a vehicle control signal based on the sound wave data corresponding to the sound wave.

Therefore, when a single sound wave is detected by the sound wave detection sensor 500, the controller 700 may be configured to output a vehicle control signal matching the corresponding sound wave data. Additionally, when a single sound wave set including a plurality of sound waves is detected by the sound wave detection sensor 500, the controller 700 may be configured to output a vehicle control signal matching the sound wave set, thus operating the control target 900.

Further, a plurality of sound waves corresponding to the sound wave set may be matched in different manners based on the order of the sound waves. Therefore, when a plurality of consecutive sound waves are sequentially detected by the sound wave detection sensor 500, even when individual identical sound waves are input, the sound wave sets may be recognized as different types of sound wave sets when the order of the sound waves differs. As a result, the controller 700 may be configured to, recognize the sound wave sets as different types of sound wave sets when sound waves having different orders are detected, and output different types of vehicle control signals, thus operating the control target 900.

Each of the patterns 310 implemented as the plurality of patterns 310 of the touch panel 100 may be formed using a plurality of projections 330 protruding from the touch panel 100, wherein the individual projections 330 may be formed in the shape of a bar and arranged on the touch panel 100 in parallel at different heights. Additionally, the projections 330 may be formed in the shape of a circle and may be arranged on the touch panel 100 in a matrix at different heights.

The patterns 310 may be formed as unique patterns 310 in which the bar shapes and the circular shapes are mixed. Accordingly, when the user does not directly view the patterns, the user may manipulate required contents by merely touching different types of patterns 310.

Moreover, any known type of sensor capable of detecting sound waves may be used as the sound wave detection sensor 500, for example a small-sized microphone, in particular, may be used. Such a microphone may be a sensor exhibiting increased reliability and may be configured to detect touched contents, enabling the detected contents to be configured in a system and may have a substantially low manufacturing cost.

The control signals output from the controller 700 are signals required to operate the control target 900, and may be used to control an Audio, Visual, Navigation (AVN) system or to operate various parts of vehicles, such as the manipulation of doors, windows, or a Head-Up Display (HUD) system or the manipulation of a vehicle instrument cluster, in addition to the AVN system. Furthermore, the control signals may be applied to other electronic devices, as well as the vehicle.

In addition, a vehicle control apparatus according to another exemplary embodiment of the present invention may include a touch panel 100 configured to be touched by a user; a sound wave generator 300 including a plurality of patterns 310 formed on the touch panel 100, the patterns 310 may be made of different materials and the sound wave generator 300 may be configured to generate sound waves having unique shapes when the user touches the patterns; a sound wave detection sensor 500 configured to detect the sound waves generated by the sound wave generator 300; and a controller 700 configured to receive the sound waves detected by the sound wave detection sensor 500 and output vehicle control signals corresponding to the respective sound waves.

Furthermore, the materials used to form the various objects may be different unique materials. Therefore, even for the same rubbing action, unique sound waves corresponding to respective different materials may be generated based on the materials of objects. Further, even for the same material, different sound waves may be generated based on the shape of the external surface of the objects.

Therefore, generator 300 when the individual patterns 310 of the sound wave generator 300 are made of different materials, such as a first material 350 and a second material 370, or are formed to have different shapes of the external surface thereof even when the patterns are made of the same material, and the user touches the patterns, the sound wave generator 300 may be configured to generate unique sound waves and output different control signals, thus enabling the control target 900 to be operated.

Figure 2:
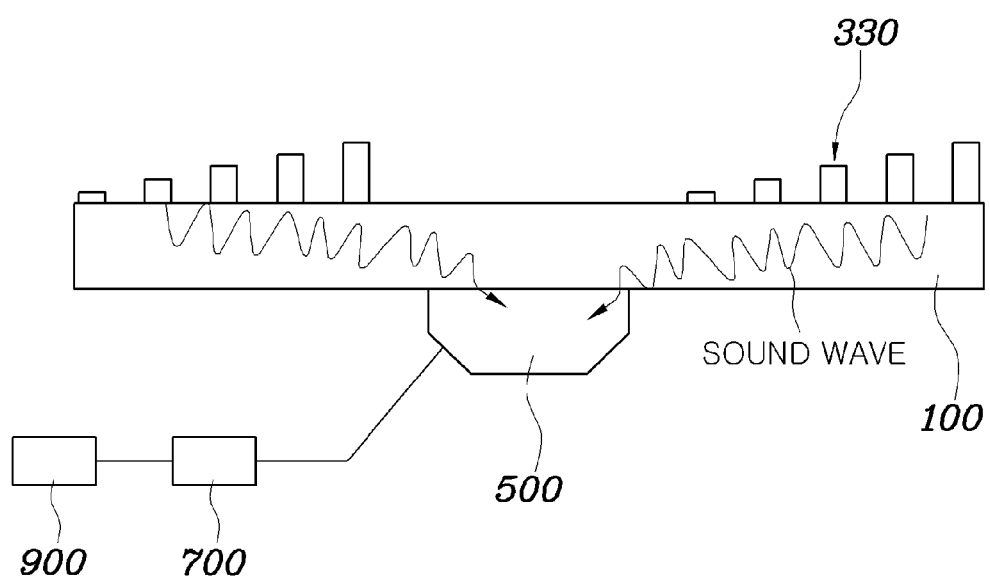
FIG. 2 is an exemplary sectional view taken along line A-A of FIG. 1, according to an exemplary embodiment of the present invention.

FIG. 2 is an exemplary sectional view taken along line A-A of FIG. 1, wherein the patterns 310 of the sound wave generator 300 formed on the touch panel 100 are shown in detail.

Each pattern 310 may include projections 330 formed to protrude and have various heights, thus generating respective unique sound waves. The touch panel 100 may be made of a substantially hard material to generate sound waves and transfer the sound waves. The sound wave detection sensor 500 may be mounted to the touch panel 100 and may be configured to detect the sound waves generated by the sound wave generator 300.

Further, since the sound wave generator 300 may include different patterns 310 which vary based on materials, shapes, or heights, the user may locate a menu at a desired location without visually checking the touch panel 100.

Figure 3:
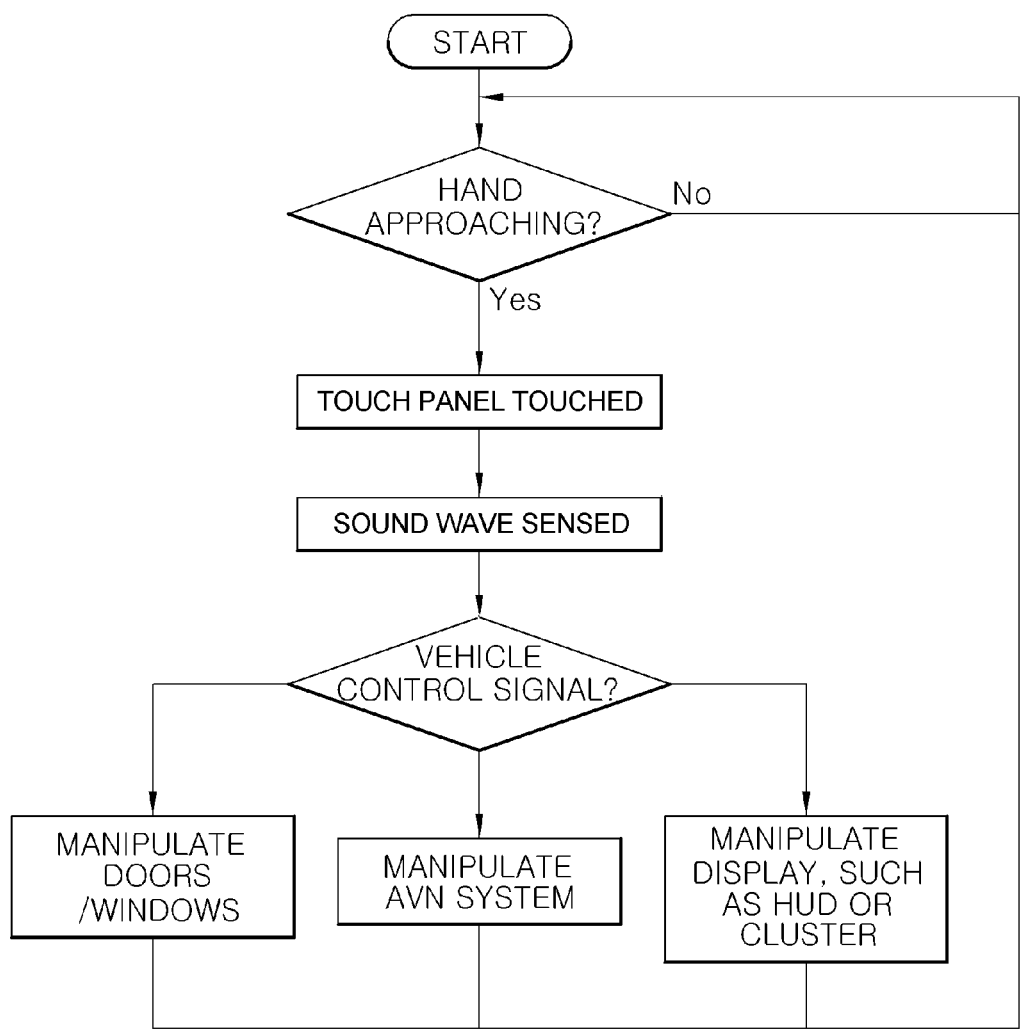
FIG. 3 is an exemplary flowchart showing an operation according to an exemplary embodiment of the present invention.

FIG. 3 is an exemplary flowchart showing an operation according to an exemplary embodiment of the present invention. The determination of whether the hand is approaching the screen may initiate the system. Unless the method of providing a separate signal for initiation is used, the system may continuously monitor the operation, thereby consuming unnecessary power. Further, when a user touches the touch panel unintentionally, the process is performed regardless of the user intention. Therefore, to prevent undesired operation from being performed, determination of an approaching hand is a first step of the process.

When a determination is made the hand is approaching, the system prepares for the recognition of an operation, and a sound wave may be generated due to vibration made by the user touch on the sound wave generator 310. The generated sound wave may be detected by the sound wave detection sensor 500, and the controller 700 may be configured to compare the sound wave detected by the sound wave detection sensor 500 with the sound waves of stored sound wave data, output a vehicle control signal matching the corresponding sound wave, and operate the control target 900 corresponding to the control signal.

FIG. 4 is an exemplary table showing a touch method according to an exemplary embodiment of the present invention. To input a desired operation, the conventional method causes the user to individually learn directions for use, but the vehicle control apparatus according to the present invention may be easily by conducting an action, such as one or two tapping actions using a finger. Accordingly, users of all ages may use the vehicle control apparatus, and the design of the vehicle control apparatus may be freely modified and used within the range of an area which the users can touch.

Further, the vehicle control apparatus may use an intuitive scheme that uses a simple action, such as one or two tapping or rubbing actions, compared to the conventional directions for use in which the user draws and inputs a specific pattern. Accordingly, various types of touches may be recognized and touch methods may be added depending on the contents of required operations, and since instructions may be given using only a few touch methods, the user may operate the vehicle control apparatus without directly viewing the screen, thus ensuring the driver safety.

Furthermore, in the vehicle control apparatus patterns varying depending on their materials, shapes, or heights are formed, and methods of tapping the patterns may be applied first to the user interface (UI) of a vehicle, thus enabling a Human Machine Interface (HMI) to be independently utilized.

Furthermore, in the present invention the vehicle control apparatus may control various parts of vehicles, such as the manipulation of doors, windows, an HUD system, and a vehicle instrument cluster, as well as an AVN system, and may also be applied to, not only vehicles, but also other electronic appliances.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A vehicle control apparatus comprising:
   a touch panel;
   a sound wave generator including a plurality of patterns formed in different shapes and different heights on the touch panel, and configured to generate sound waves having unique shapes when a user touches the patterns on the touch panel;
   a sound wave detection sensor configured to detect the sound waves generated by the sound wave generator; and
   a controller configured to receive the sound waves detected by the sound wave detection sensor and output vehicle control signals corresponding to the respective sound waves.

2. The vehicle control apparatus of claim 1, further comprising:
   sound wave data stored on a memory of the controller, wherein the vehicle control signals match the sound waves, and the controller is configured to, output a vehicle control signal matching the corresponding sound wave based on the sound wave data when a sound wave is received from the sound wave detection sensor.

3. The vehicle control apparatus of claim 2, wherein the sound wave data includes:
   a single sound wave set including a plurality of sound waves matches a single vehicle control signal, wherein the controller is configured to, output a vehicle control signal matching a corresponding sound wave set based on sound wave sets of the sound wave data when a plurality of sound waves are consecutively received from the sound wave detection sensor.

4. The vehicle control apparatus of claim 3, wherein the sound wave sets are classified as different types of sound wave sets and match different types of vehicle control signals, and the controller is configured to, detect a corresponding sound wave set based on an order of the sound waves when a plurality of sound waves are consecutively received from the sound wave detection sensor, and output a vehicle control signal matching the sound wave set.

5. The vehicle control apparatus of claim 1, wherein each of the patterns includes a plurality of projections protruding from the touch panel.

6. The vehicle control apparatus of claim 5, wherein the projections are formed in a shape of a bar and arranged in parallel on the touch panel at different heights.

7. The vehicle control apparatus of claim 5, wherein the projections are formed in a shape of a circle and arranged on the touch panel in a matrix at different heights.

8. The vehicle control apparatus of claim 1, wherein the sound wave detection sensor is a microphone.

9. The vehicle control apparatus of claim 1, wherein the control signals output from the controller are signals required to operate an Audio, Visual, Navigation (AVN) system.

10. A vehicle control apparatus comprising:

a touch panel configured to be touched by a user;

a sound wave generator including a plurality of patterns formed on the touch panel, wherein the patterns is made of different materials and the sound wave generator is configured to generate sound waves having unique shapes when the user touches the patterns;

a sound wave detection sensor configured to detect the sound waves generated by the sound wave generator; and a controller configured to receive the sound waves detected by the sound wave detection sensor and output vehicle control signals corresponding to the respective sound waves.

* * * * *